(12) United States Patent
Sato et al.

(10) Patent No.: US 6,871,585 B2
(45) Date of Patent: Mar. 29, 2005

(54) PRESSURE METHOD FOR AN ELECTRODE STRUCTURE

(75) Inventors: Takaya Sato, Chiba (JP); Tatsuo Shimizu, Tokyo (JP)

(73) Assignees: Nisshinbo Industries, Inc., Tokyo (JP); Itochu Corp., Osaka (JP)

( * ) Notice: Subject to any disclaimer, the term of this patent is extended or adjusted under 35 U.S.C. 154(b) by 0 days.

(21) Appl. No.: 10/119,582

(22) Filed: Apr. 11, 2002

(65) Prior Publication Data

US 2003/0029333 A1 Feb. 13, 2003

(30) Foreign Application Priority Data

Apr. 12, 2001 (JP) .................................... 2001-114444

(51) Int. Cl.⁷ ................................................ B30B 11/22
(52) U.S. Cl. ...................................... 100/41; 100/176
(58) Field of Search .......................... 100/155 R, 160, 100/168, 170, 172, 35, 176, 41; 361/502; 156/157

(56) References Cited

U.S. PATENT DOCUMENTS 4,101,370 A * 7/1978 Russell ....................... 100/151
5,277,729 A * 1/1994 Endo et al. .................. 156/157
6,199,404 B1 * 3/2001 Kawai et al. ................. 65/102

FOREIGN PATENT DOCUMENTS

| JP | 5-129020 | * | 5/1993 |
| JP | 10-214617 | * | 8/1998 |
| JP | 10-270296 | * | 10/1998 |

* cited by examiner

Primary Examiner—Allen Ostrager
Assistant Examiner—Jimmy T Nguyen
(74) Attorney, Agent, or Firm—Apex Juris, pllc; Tracy M Heims

(57) ABSTRACT

A pressure method for an electrode without causing any breakage of a current collecting material. The electrode structure comprises the current collecting material and an electrode layer. The electrode layer has a smaller surface area than a surface area of the current collecting material. The work roll with the concave portion pressurizes the electrode layer coated on the current collecting material while the convex portion to the section of the current collecting material without the electrode layer coated thereon where said section of the current collecting material is the predetermined distance away from the electrode layer, thereby elongating the electrode layer and the current collecting material.

8 Claims, 13 Drawing Sheets

Rotational Direction

Pressing Angle θ

PRESSURE METHOD FOR AN ELECTRODE STRUCTURE

BACKGROUND OF THE INVENTION

1. Field of the Invention

This invention relates to a technology of pressurizing an electrode structure for electrical components such as a battery and a capacitor.

2. Description of the Related Art

Traditionally, an electrode layer with a current collecting material coated thereon is rotated under pressure in order to be densified to finally produce an effective electrode structure. Therefore, if we consider an electrode structure 'a', having long electrode layers 'b' with smaller surfaces relative to a long current collecting material 'c' as shown in FIG. 13(A), the electrode structure a is sandwiched between a pair of work rollers 'd' and 'd' as shown in FIG. 13(B). Thus, the electrode layers 'b' and the current collecting material 'c' without an electrode layer coated thereon are rotated under pressure to elongate the same together. However, if the electrode layers 'b' and the current collecting material 'c' without an electrode layer coated thereon are rotated under pressure, the current collecting material 'c' is cut out around an edge of the electrode layer 'b' (i.e., a breakage-point e) as shown in FIG. 13(C).

SUMMARY OF THE INVENTION

An object of this invention is to provide a pressure method for an electrode without causing any breakage of a current collective member.

Another object of this invention is to facilitate manufacture of an electrode of layer-type.

In accordance with these objectives, the instant invention is a pressure method for an electrode structure comprising a step of pressurizing the electrode structure comprised of a current collecting material and an electrode layer whereby the electrode layer has a smaller surface area than a surface area of a current collecting material a current collecting material, wherein when the electrode layer and a section of the current collecting material without the electrode layer coated thereon are pressurized, the electrode layer and a portion of the current collecting material which is a predetermined distance away from the a boundary between the current collecting material without the electrode layer coated thereon and the current collecting material with the electrode layer are pressurized, thereby elongating the same.

The instant invention also is a pressure method for an electrode structure comprising of a step of pressurizing the electrode structure comprised of a long current collecting material and a long electrode layer said electrode layer has a smaller surface area than a current, collecting material wherein when the electrode layer and a section of the current collecting material without the electrode layer coated thereon are pressurized, the electrode layer and a portion of the current collecting material which is a predetermined distance away from the a boundary between the current collecting material without the electrode layer coated thereon and the current collecting material with the electrode layer are pressurized, thereby elongating the same.

The instant invention also is the pressure method for the electrode structure as above, wherein the electrode layer is formed to face both surfaces of a current collecting material.

The instant invention also is the pressure method for the electrode structure as above, wherein a pair of rollers, a surface of one roller linearly parallel to the roller axle and a surface of the other roller stepped along the roller axle, sandwich and pressurize the electrode structure therebetween.

The instant invention also is the pressure method for the electrode structure as above, wherein a pair of rollers, surfaces of both rollers stepped along the roller axle, sandwich and pressurize the electrode structure therebetween.

This application hereby incorporates by reference Japanese Patent Application No. 2001-114444 filed Apr. 12, 2001 in Japan.

BRIEF DESCRIPTION OF THE DRAWINGS

The embodiments of the invention are next described while referring to the accompanying drawings.

DETAILED DESCRIPTION OF PREFERRED EMBODIMENTS

Figure 1A:
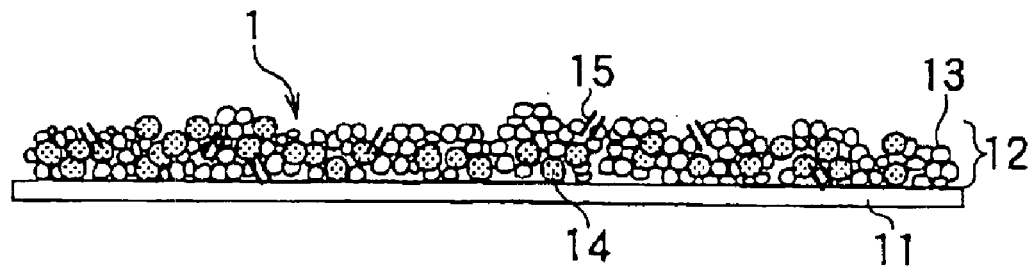
FIG. 1(A) represents a drawing of one type of electrode structure containing electrode material.

In an electrical component, in which ions migrate between electrodes, ion conductive materials are arranged between electrode structures as electrode, and ions migrate within the ion conductive materials and electric current flows between the electrodes. For instance, such electrical component includes a battery, an electrical double layer capacitor, etc.

In a battery, ion conductive materials are arranged between two types of electrode structures, i.e., a positive electrode structure and a negative electrode structure, and ions (including protons, i.e., cations of hydrogen) migrate from one of the electrode structures to the other electrode structure and are accumulated there. In an electrical double layer capacitor, ion conductive materials are arranged between a pair of electrode structures, and an electrical double layer is formed between a material with high surface area in the electrode structure and an electrolyte of the ion conductive material.

As shown in FIG. 1, an electrode structure is used as an electrode of an electrical component, and it can deliver and receive electricity to and from ions or it can attract ions. In this respect, an electrode structure 1 comprises a layer of electrode material 13 (an electrode material layer 12) on a conductive material such as aluminum or copper, and the electrode material can deliver and receive electricity to and from ions and has electric attracting power. As shown in FIG. 1(A), the electrode material 13 is used as a positive electrode structure of a battery using particulate material comprising bonded particles of powdery electrode active material such as $LiCoO_2$. As shown in FIG. 1(B), the electrode material 13 is used as a negative electrode structure of a battery and uses particulate material such as graphite, hard carbon, etc. of powdery electrode active material. As shown in FIG. 1(C), the electrode material 13 uses particulate material such as activated carbon, i.e., a powdery high surface area material with larger surface area, and is used as an electrode structure 1 of an electrical double layer capacitor. In FIG. 1, the electrode material layer 12 is formed on one surface of a current collecting material 11, while the electrode material layer 12 may be provided on both surfaces.

Figure 1B:
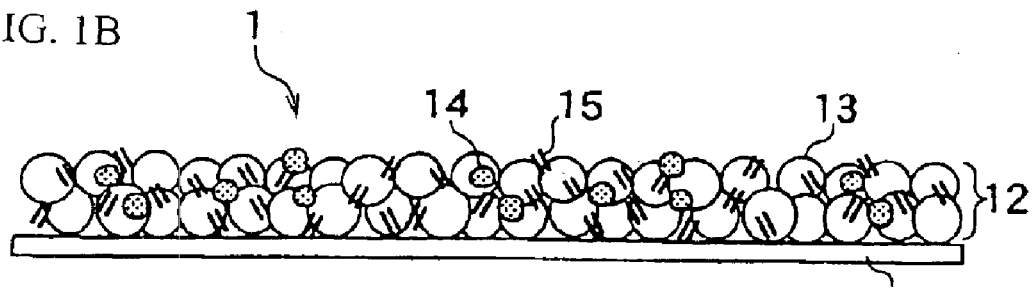
FIG. 1(B) represents a drawing of another type of electrode structure containing electrode material.
Figure 1C:
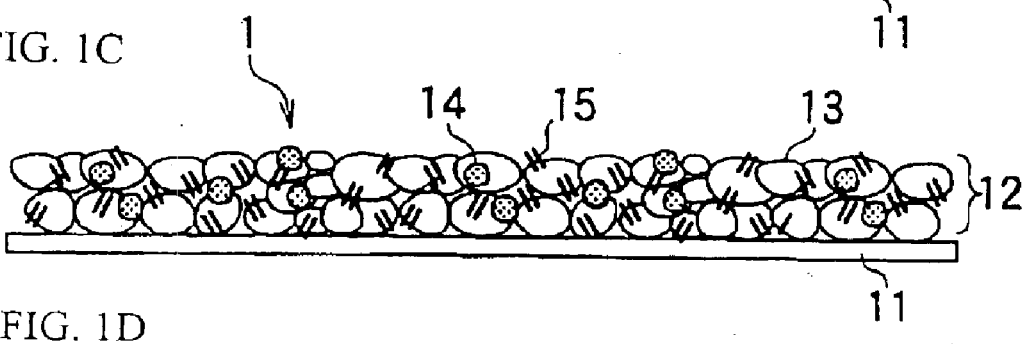
FIG. 1(C) represents a drawing of another type of electrode structure containing electrode material.
Figure 1D:
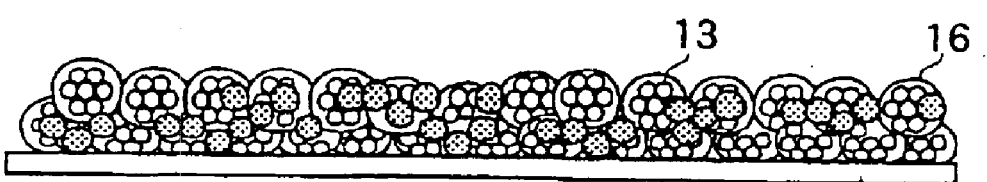
FIG. 1(D) represents a drawing of another type of electrode structure containing electrode material.
Figure 1E:
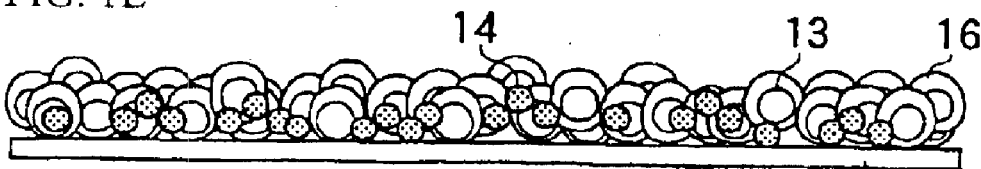
FIG. 1(E) represents a drawing of another type of electrode structure containing electrode material.
Figure 1F:
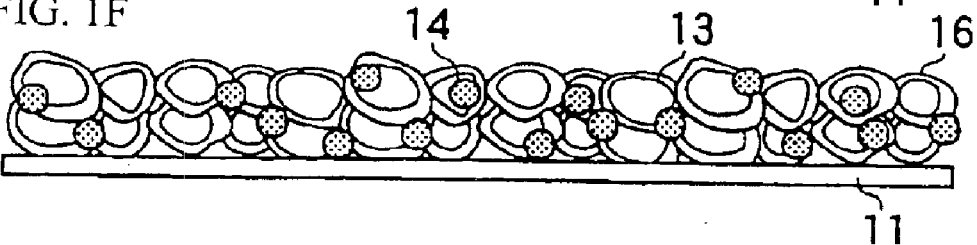
FIG. 1(F) represents a drawing of another type of electrode structure containing electrode material.

In FIG. 1(D), the powdery electrode material 13 of FIG. 1(A) is covered with ion conductive polymer, and it is used as a positive electrode structure of a battery. In FIG. 1(E), the powdery electrode material 13 of FIG. 1(B) is covered with ion conductive polymer, and it is used as a negative electrode structure of a battery. In FIG. 1(F), the powdery electrode material 13 of FIG. 1(C) is covered with the ion conductive polymer, and it is used as an electrode structure 1 of an electrical double layer capacitor.

Figure 2:
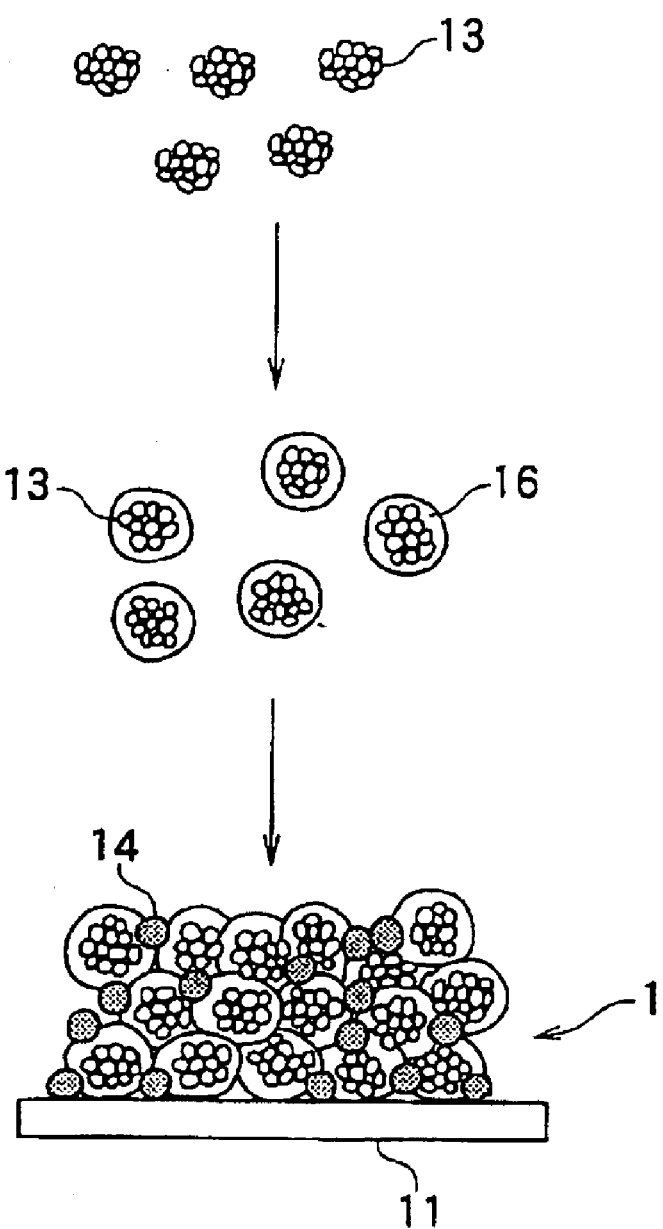
FIG. 2 represents a drawing of an electrode structure containing electrode active material.

FIG. 2 shows a process to produce the electrode structure 1 of FIG. 1(D). As shown in FIG. 2, the powdery electrode material 13 comprises bonding particles such as $LiCoO_2$, and it is covered with an ion conductive polymer 16 and is attached to a current collecting material 11. The electrode structure 1 as shown in each of FIG. 1(E)–FIG. 1(F) can also be produced in similar manner. The conductive material 14 arranged in the electrode structure enhances electrical conductivity between the electrode material 13 and the current collector 11 and it improves current collecting efficiency.

Here, "adhere" or "adhesion" means that ions are attached in such manner that the ions can migrate between the ion conductive polymer 16 and the entire surface of the powdery electrode material. It means that the ion conductive polymer 16 adheres to the surface of the powdery electrode material 13 and covers it with the ion conductive polymer 16. The finer the particles are, the more active the powdery electrode material 13 is. When it is adhered to and covered by the ion conductive polymer 16, the activity is suppressed and can be turned to more stable state.

When the deposit of ion-conducting polymer 16 is thick, the electrical conduction decreases, and the current (charge) collection is poor. Accordingly, forming a thin coating of ion-conducting polymer is preferable.

The word "powdery" in the powdery electrode material 13 and the powdery conductive material 14 means the condition of a material in fine powder state. In certain cases, this fine particle substance refers to a state wherein a large number of substances in a fine particle state constitute an agglomeration.

Relation to terminologies used to explain the electrode structure 1 will be explained hereunder. In FIG. 1, the electrode structure 1 is obtained by forming the electrode material layer 12 on the current collecting material 11. The electrode material layer 12 has the electrode material 13 and also has an electrically-conductive material 14 and a binder 15 as required. The electrode material 13 is an electrode active material used as an electrode of a battery or a high surface area material used as an electrode such as electrical double layer capacitor. The electrode active material means a powdery electrode active material for positive electrode such as $LiCoO_2$ to be used as a positive electrode, or a powdery electrode active material for negative electrode such as carbon material to be used as a negative electrode.

The electrode structure, with the ion conductive polymer layer formed on the electrode material surface, is obtained. The ion conductive polymer layer is placed between the positive electrodes. Dissolving ions on the ion conductive polymer layer facilitates migration between the pair of electrode structures.

As the electrode active material, a material where ions can be placed into or removed from, or a π-conjugate conductive macromolecular material may be used. For instance, there is no specific restriction on the use of the electrode active material to be used as a positive electrode of a nonaqueous electrolyte battery, but in case of a chargeable secondary battery, a chalcogen compound where lithium ions can be placed into or removed from, or a complex chalcogen compound containing lithium may be used.

$FeS_Z$, $TiS_2$, $MoS_2$, $V_2O_5$, $V_6O_{13}$, and $MnO_2$ may be employed as the above-chalcogen compounds. The chalcogen compound having lithium as described above includes lithium composite oxide, $LiNiO_2$, $LiMnO_2$, and $LiMn_2O_4$ being represented by $LicO_2$, $Li_xNi_yM_{1-y}O_2$ (where M represents at least one type of metal element selected from transition metal or aluminum, or more preferably, it represents at least one type of metal element selected from Co, Mn, Ti, Cr, V, or Al, and 0.05 x 1.10 and 0.5 y 1.0). Using oxide, salt or hydroxide of lithium, cobalt, nickel or manganese as starting materials, these starting materials are mixed in adequate composition, and the mixture is fired in the temperature range of 600–1000 degree Celsius under oxygen atmosphere.

There are no particular restrictions on the electrode active substance used as the negative electrode for non-aqueous electrolyte batteries. However, a material allowing lithium ion insertion/separation may be used, and lithium metal, lithium alloys (alloys such as lithium and aluminum, lead, indium) and carbon quality materials may be utilized.

Polyacetylene types, polyaniline types, polypyrrole types, polythiophene types, poly-ρ(para)-phenylene types, polycarbazole types, polyacene types and sulfur polymer types are among the useful π-conjugated conductive macromolecular materials.

In particular, in a nonaqueous electrolyte primary battery, higher battery capacity can be obtained when lithium metal is used in the negative electrode. Lithium metal not in powdery state may be used.

Also, in the nonaqueous electrolyte secondary battery, excellent cycle service life can be attained if a carbon material where lithium ions can be placed into and removed from is used as the negative electrode. There are no particular restrictions on the carbon material used but materials such as pyrolytic carbon types, coke types (pitch coke, needle coke and petroleum coke, etc.) graphite types, glass carbon types, organic macromolecular compound fired products (carbonized pieces baked to a suitable temperature such as phenol resin, furan resin) carbon fibers and active carbon may be utilized.

The electrode material with larger surface area is a powdery large surface area material, which can attract many ions to the surface. Preferably, a carbon material is used as the powdery large surface area material with the specific surface area of 500 m$^2$/g or more, or preferably 1000 m$^2$/g or more, or more preferably 1500 m$^2$ μg –3000 m$^2$/g and with the average particle size of 30 μm or less, or preferably 5–30 μm. If specific surface area and average particle size are out of the above range, capacitance is too high, and it may be difficult to obtain an electrical double layer capacitor with low resistance.

As the powdery large surface area material, it is preferable to use activated carbon, which can be obtained from carbon material by steam activation method or by melted KOH activation process. For example palmae shell type activated carbon types, phenol type activated carbon, petroleum coke type activated carbon, and polyacene may be used as activated carbon. These materials may be used alone or in a combination of two types or more. Among those, because of a large electrostatic capacity, phenol type activated carbon, petroleum cokes type activated carbon, and polyacene are preferable.

The conductive material is used to increase electrical conductivity of the electrode structure, and there is no specific restriction. For instance, metal power such as carbon black, ketchen black, acetylene black, carbon whisker, natural graphite, artificial graphite, metal fiber, titanium oxide, ruthenium oxide, etc. may be used. These materials may be used alone or in a combination of two types or more. It is preferable to use one type of carbon black, i.e., ketchen black or acetylene black. Average particle size of the powdery conductive material is preferably 10–100 nm, or more preferably 20–40 nm.

As electrolyte, the following materials may be used: chain ethers such as dibutyl ether, 1,2-dimethoxyethane, 1,2-ethoxymethoxyethane, methyldiglyme, methyltriglyme, methyltetraglyme, ethylglyme, ethyldiglyme, butyldiglyme, etc., glycol ethers (such as ethyl cellosolve, ethyl carbitol, butyl cellosolve, butyl carbitol, etc.), heterocyclic ethers such as tetrahydrofurane, 2-methyl tetrahydrofurane, 1,3-dioxolan, 4,4-dimethyl-1,3-dioxan, etc., butyrolactones such as γ-butyrolactone, γ-valerolactone, δ-valerolactone, 3-methyl-1,3-oxazolidine-2-one, 3-ethyl-1,3-oxazolidine-2-one, et., and other amide solvent normally used for electrochemical products (N-methylformaldehyde, N,N-dimethylformaldehyde, N-methylacetamide, N-methyl-2-pyrrolidone, etc.), carbonate solvent (such as diethyl carbonate, dimethyl carbonate, ethylmethyl carbonate, propylene carbonate, ethylene carbonate, styrene carbonate, etc.), imidazolidinone solvent (such as 1,3-dimethyl-2-imidazolidinone), etc. may be used. These solvents may be used alone or in a combination of two types or more.

The ion conductive polymer is a polymer, which can dissolve at least an ion conductive salt such as lithium salt as given below at concentration of 0.1 M (mol/l) or more, and the polymer dissolving ion conductive salt such as lithium salt at concentration of 0.1 M or more shows electrical conductivity or $10^{-8}$ S (siemens)/cm or more at room temperature. Preferably, it is an ion conductive polymer, which dissolves at least ion conductive salt such as lithium salt at concentration of 0.8M–1.5M having electrical conductivity of $10^{-3}$ S/cm–$10^{-5}$ S/cm at room temperature.

The lithium salt is at least one type of lithium salt having $ClO_4^-$, $CF_3SO_3^-$, $BF_4^-$, $PF_6^-$, $AsF_6^-$, $SbF_6^-$, $CF_3CO_2^-$ or $(CF_3SO_2)_2N^-$ as anion.

Here, description will be given on the relationship of the terms relating to the ion conductive polymer. The material for forming the ion conductive polymer is a material for preparing ion conductive polymer layer 2 to be formed on the electrode structure 1 or an ion conductive polymer, which is adhered to powdery electrode material. It represents an ion conductive polymer itself, an ion conductive polymer raw material, or both. A coating material 22 for forming the ion conductive polymer is a material to be coated for forming the ion conductive polymer layer, and it is a mixture of the material for forming ion conductive polymer itself or ion conductive salt or solvent.

The ion conductive polymer raw material is a material, which is turned to an ion conductive polymer by polymerization, crosslinking, etc. when energy is added from outside. The energy to be added is heat, ultraviolet ray, light, electronic beam, etc. The ion conductive polymer raw material is added to give physical strength such as form retaining property.

Under the condition where the ion conductive polymer itself and the ion conductive polymer raw material coexist, energy is added from outside, and the ion conductive polymer raw material is allowed to react, and a 3-dimensional network is formed. In this case, the ion conductive polymer itself is entangled with the 3-dimensional network (entanglement). This is called "semi-interpenetrating network system" and shows excellent physical property. The ion conductive polymer having such structure is described in the Japanese provisional patent publication JP-A-8-225626 as filed by the present inventors. The ion conductive polymer thus obtained has high strength, absorbs the solvent well and has high adhesive strength. The ion conductive polymer obtained from the ion conductive polymer itself and ion conductive polymer raw material is such that a polymer dissolving lithium salt at concentration of 0.1 M or more shows electrical conductivity of $10^{-8}$ S (siemens)/cm or more, or more preferably $10^{-5}$ S/cm or more, or most preferably $10^{-3}$ S/cm or more at room temperature. A cellulose type semi-interpenetrating network system (IPN) is described in the Japanese Provisional Patent Publication No. JP-A-8-225626; PVA type semi-interpenetrating network system is disclosed in the Japanese Patent Application 11-78087 (PCT/JP 00/01734); polyglycidol semi-interpenetrating network system is disclosed in Japanese Patent Application No.10-358825 (PCT/JP 99/07039); and polyurethane type semi-interpenetrating network system is disclosed in the Japanese Patent Application No.11-78085 (PCT/JP 00/01731). All of the aforementioned documents are hereby incorporated by reference.

As the ion conductive salt, any material normally used for electrochemical product may be used; and there is no specific restriction. In particular, it is preferable to use a salt obtained by combination of quaternary onium cation expressed by general formula $R^1R^2R^3R^4N^+$ or $R^1R^2R^3R^4P^+$ (where $R^1$–$R^4$ each represents an alkyl group having 1–10 carbon atoms and may be the same or different) with anion such as $BF_4^-$, $N(CF_3SO_2)_2^-$, $PF_6^-$, $ClO_4^-$, etc.

More concretely, as the ion conductive salt used for the capacitor, the following materials may be used: $(C_2H_5)_4PBF_4$, $(C_3H_7)_4PBF_4$, $(C_4H_9)_4PBF_4$, $(C_6H_{13})_4PBF_4$, $(C_4H_9)_3CH_3PBF_4$, $(C_2H_5)_3(Ph—CH_2) PBF_4$ (where Ph represents a phenyl group), $(C_2H_5)_4PPF_6$, $(C_2H_6)PCF_3SO_2$, $(C_2H_5)_4NBF_4$, $(C_6H_{13})_4NBF_4$, $(C_2H_6)_6NBF_6$, $LiBF_4$, $LiCF_3SO_3$, etc. These materials m used alone or in a combination of two types or more.

As the ion conductive salt used for nonaqueous electrolyte secondary battery such as lithium ion battery, any material normally used for electrochemical product may be used, and there is no specific restriction. For instance, $LiClO_4$, $LiBF_4$, $LiAsF_6$, $LiSbF_6$, $LiCF_8SO_3$, $LiCF_2COO$, $NaClO_4$, $NaBF_4$, $NaSCN$, $KBF_4$, $Mg(ClO_4)_2$, $Mg(BF_4)_2$, $(C_4H_9)_4NBF_4$, $(C_2H_5)_4NBF_4$, $(C_4H_9)_4NClO_4$, $LiN(CF_2SO_2)_2$, $Et_4NPF_6$ (where Et represents an ethyl group), etc. may be used. These materials may be used alone or in a combination of two types or more.

The current collecting material 11 may be any material which allows electric current to pass. Its shape and material are selected depending upon each electrical component. As an example, a conductive material such as aluminum, copper, etc. is formed in planar shape, or in form of foil or mesh. The surface is processed by chemical, electrical or physical process or by a process combining these processes, and surface irregularities and coarse surface are formed to provide a current collecting material with better adhesion property. In case of the current collecting material 11 in form of planar shape or foil, one surface or bath surfaces are used depending on the structure of the electrical component, and the electrode material is attached on one surface or both surfaces. A wider current collecting material may be used for an electrode whole material.

In the following, description will be given on a method for manufacturing the electrode structure:

In order to form an electrode structure layering a positive electrode and a negative electrode, for example, a layered-type electrode structure with multiple layered electrodes as shown in FIG. 3, one electrode comprises electrode material layers formed on a certain shape of current collecting material and a lead becoming a terminal of an electrical component. In FIG. 3, an electrode material layer 121 of the positive electrode and an electrode material layer 122 of the negative electrode are alternatively layered having a separator 18 inbetween them. A positive electrode lead 1111 is attached to the electrode material layer of the positive electrode while a negative electrode lead 1112 is attached to the electrode material layer of the negative electrode.

Figure 4:
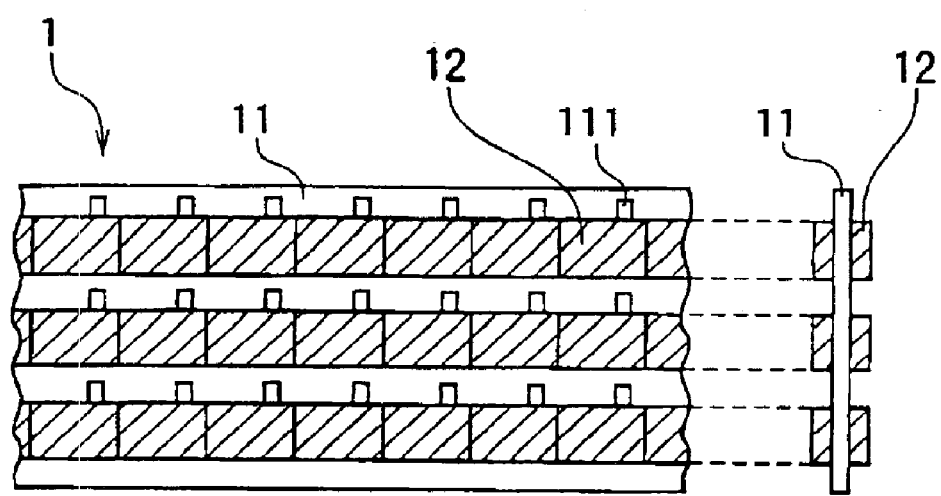
FIG. 4 represents a drawing of the long electrode structure formed in plural rows.

A shape of the electrode structure may be a shape of the electrode itself or a long wide along the current collecting material, for example as shown in FIG. 4. For instance, the long wide electrode structure 1 may be 1000 m–2000 m in its length and 500 mm–1000 mm in its width. The long wide electrode may be a single electrode structure or multiple electrode structure with a gap between each electrode structures. In order to obtain an electrode from this long wide electrode structure 1, it is cut in accordance with the shape of electrode materials layered on the electrode material layer 12. At that time, preferably, a part of the current collecting material 11 may be cut in the way to be used as the lead 111 of the electrode. The electrode cut, for example, may be a strap shape with 600 mm in its length and 50 mm in its width. The negative electrode may be longer and wider than the positive electrode, for example, for about 1 mm. Accordingly, dendrite short-circuit may be prevented.

For formation of the electrode material layer, the solvent is added in the electrode material to turn to liquid and paste-like state to be thinly coated on the surface of the current collecting material. After coating, the solvent is evaporated, the product is dried, and the electrode structure with the electrode material layer formed on the wide current collecting material is obtained. As the device to coat on the current collecting material, a doctor knife applicator is used.

In order to improve the electric characteristics of the electric component or for example to improve the ion migration and electric flow between the current collecting material 11 and the electrode material layers 12, the current collecting material 11 and the electrode layers 12 thereon are pressurized. Pressurizing elongates the current collecting material 11 on which the electrode material layers 12 are coated together with the electrode material layers 12, the current collecting material without an electrode material layer coated thereon needs to be pressurized and elongated. At that time, in order to prevent the breakage at a portion of the current collecting material around the boundary between the current collecting material without the electrode material layer coated thereon and the current collecting material with the electrode material layer coated thereon, a cushioning space 431 is formed around a portion of the current collecting material without the electrode layer coated thereon which is located with a certain cushioning distance between the boundary and the convex portion 432. The certain distance depends upon the size and thickness of the electrode material layer and the current collecting material to be pressurized. For example, the cushioning distance between the cushioning member and the electrode material preferably is 1 mm–3 mm. With this cushioning distance in the experiment, although the pressurizing caused a wrinkling, no breakage was found. This wrinkling existed between the lead and the electrode material layer helps to prevent the breakage of the lead.

Figure 5:
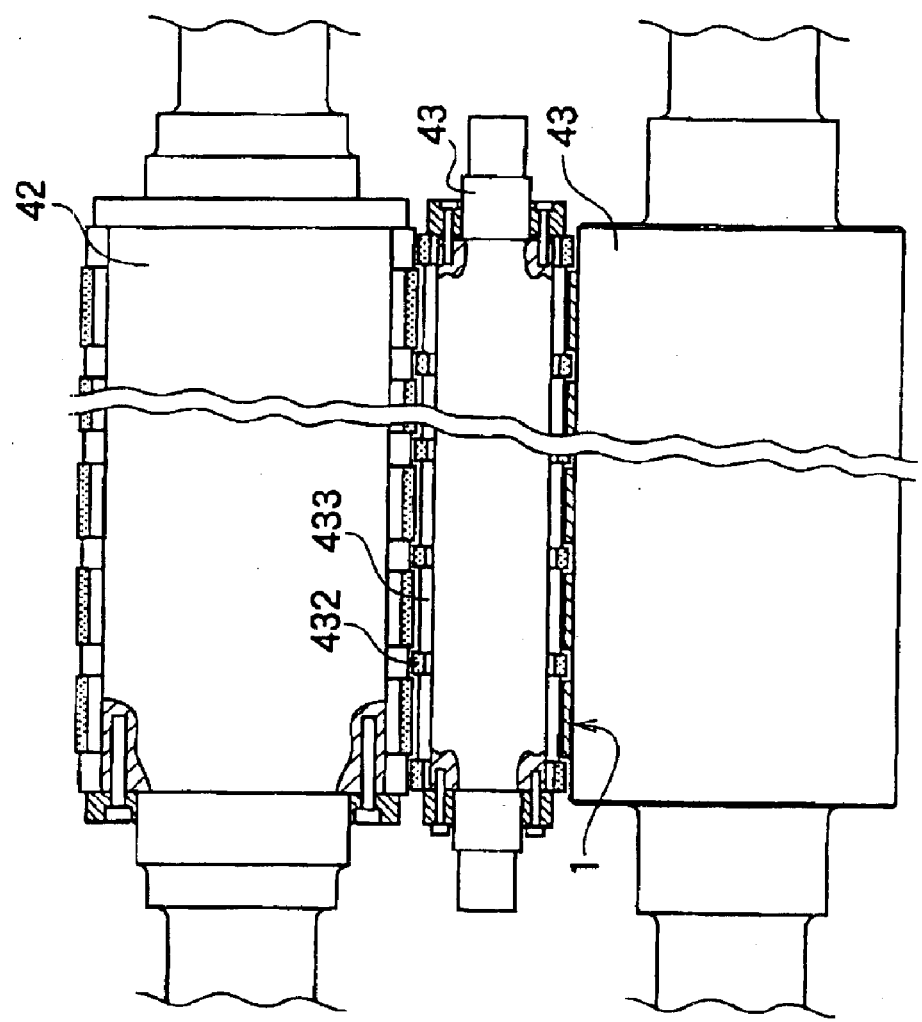
FIG. 5 represents a drawing of the electrode structure under pressure.
Figure 6A:
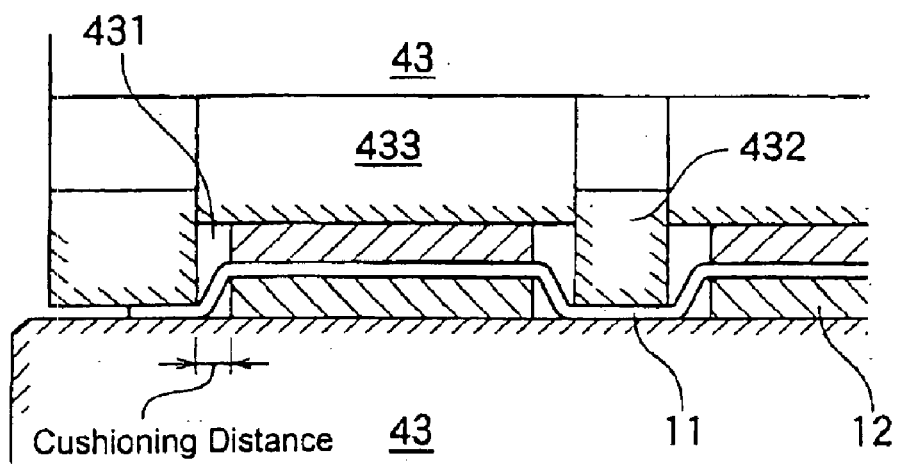
FIG. 6(A) represents an enlarged view of the electrode structure under pressure.
Figure 6B:
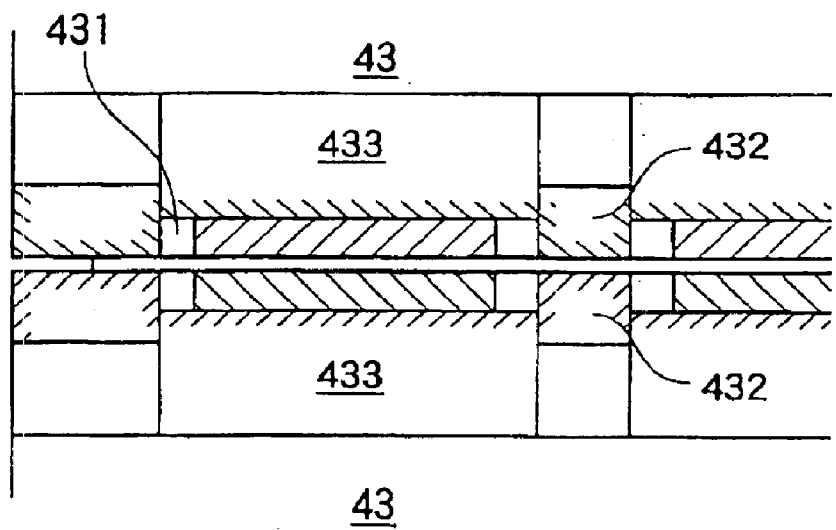
FIG. 6(B) represents an enlarged view of the electrode structure under pressure.
Figure 7:
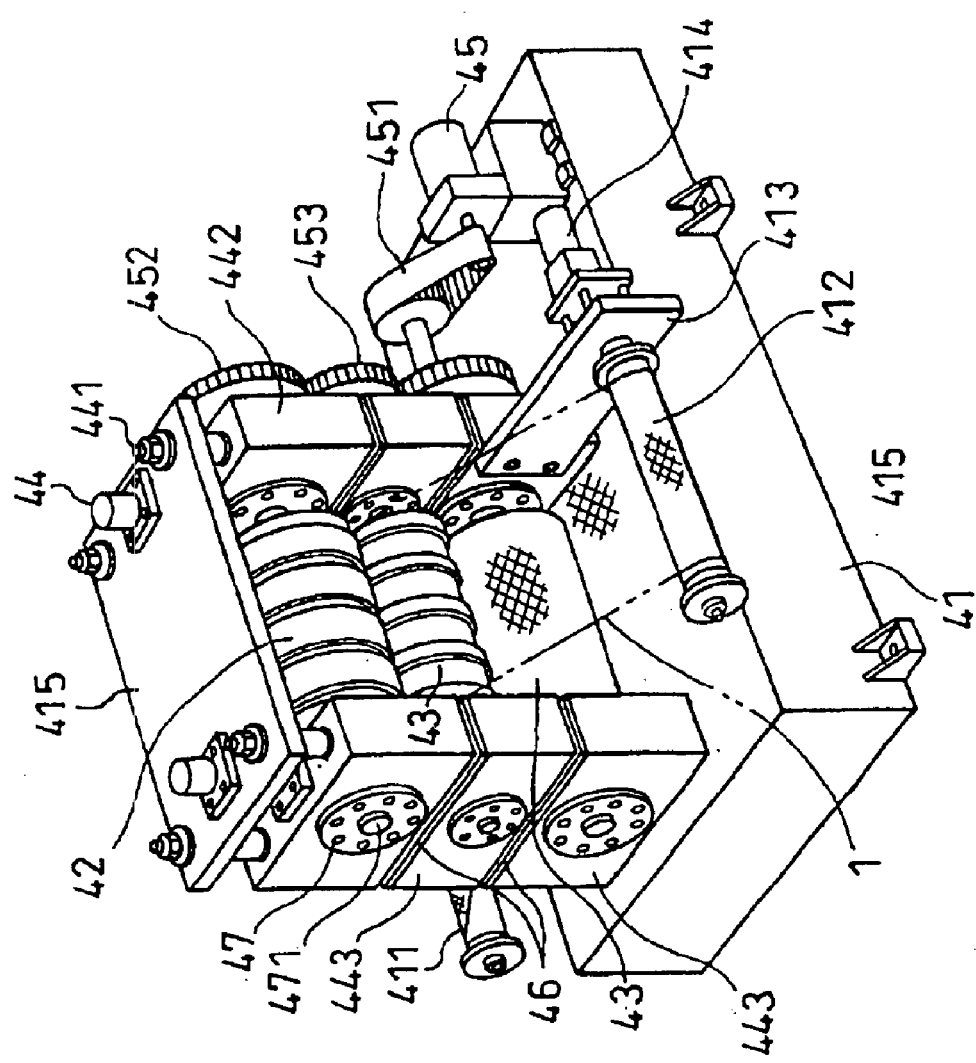
FIG. 7 represents the rolling pressure device with three rolls.
Figure 8:
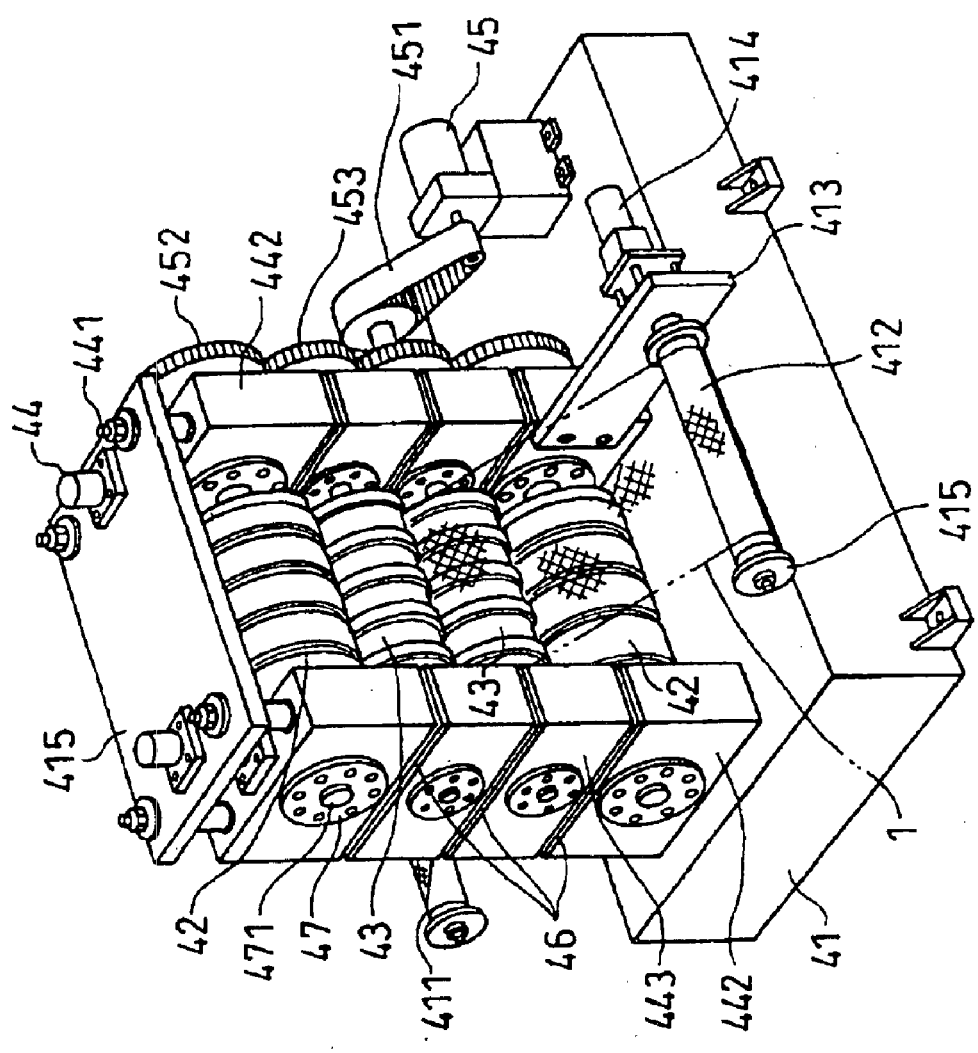
FIG. 8 represents the rolling pressure device with four rolls.

In an example of a long electrode structure, the pressure method for the electrode structure may be conducted by rotating under pressure with the rolling pressure device as shown in FIG. 5. Rotating under pressure for example is conducted by sandwiching an object between a pair of rolls and pressurizing the object as rolling it out. In FIG. 5, the electrode structure 1 is sandwiched between a small diameter work roll 43 and a large diameter work roll 43; the backup roll 42 rotates the small diameter work rolls 43 under pressure; and the electrode structure between the two work rolls 43, 43 is rotated under pressure. A partially enlarged section of FIG. 5 is shown in FIG. 6(A). A surface in the axial direction of the small diameter work roll 43 is convex-concave while a surface in the direction of the large diameter work roll 43 is a flat. A thicker portion of the electrode material layer abuts against the concave portion 433 and the current collecting material abuts against the convex portion 432. Here, the current collecting material without the electrode material layer coated thereon is rotated under pressure with the cushioning distance. Materials to be used for work rolls depend upon an object to be rotated under pressure. For example, the convex portion 432 of the small diameter work roll 43 may be steel or an elastic material while the concave portion 433 may be steel. The surface of the large diameter work roll 43 may be steel. An isometric view of the rolling pressure device as described is shown in FIG. 7. Further, the electrode structure may be rotated under pressure by sandwiching the same between a pair of small diameter work rolls 43, 43; and an enlarged portion of the rolling pressure device is shown in FIG. 6(B) while the isometric view of the device is shown in FIG. 8. A steel roll and an elastic roll are described as types of roll materials herein; however, a combination of steel and elastic material and other materials including resin in consideration of durability may be used.

The rolling pressure device in FIG. 7 comprises the small diameter work roll 43, the large diameter work roll 43 and the backup roll 42 to pressurize the small work roll 43. The rolling pressure device of FIG. 8 comprises a pair of small diameter work rolls 43, 43 and a pair of large diameter backup rolls 42, 42 to pressurize the small diameter work rolls 43, 43. The backup roll 42 is manufactured by adhering an extra-hard elastic material on surface of a very hard material in order to prevent a possible damage to the surface of the work roll 43 in case of their contact. This extra-hard elastic material may be denatured urethane or polyimide; and the hardness for example may be 90°–98° at Rubber Code Shore D Scale of JIS. The thickness of the extra-hard elastic material for example may be 10 mm–30 mm. The elastic material is positioned on the surface of the backup roll 42.

The surface in the axial direction of the work roll is convex-concave surface. A thicker portion of the electrode material layer abuts against the concave portion and the current collecting material abuts against the convex portion. Here, the current collecting material without the electrode material layer coated thereon is rotated under pressure with the cushioning distance. Providing the cushioning distance prevents the breakage of the current collecting material upon pressurizing the electrode structure. In FIG. 6(A), convex-concave portions may be formed on the large diameter work roll as shown in FIG. 6(B); and in FIG. 6(B), the surface in the axial direction of one of the two small diameter work rolls ma be rectilinearly formed.

A drive 45 such as a motor driving a roll and a backup roll housing 424 having a bearing section 47 of the lower backup roll 42 are positioned on the rolling pressure device base 41. Work roll housings 443, 443 of the pair of work rolls 43, 43 are positioned on lower backup roll housing 442 via adjustment plate 46; and a backup roll housing 442 of the upper backup roll is positioned on the work roll housings 443, 443 via the adjustment plate 46. A roll axle 471 is rotatably installed at each bearing portions 47.

The drive 45 comprises a drive belt 451, backup roll drive gears 452, and a work roll drive gear 453.

Each backup roll housings 442 and each work roll housings 443 has a hole through which a tie-bar 441 is penetrating; and each work roll housing 443 and each backup roll housing 442 is positioned between the rolling pressure device base 41 and an upper frame plate to be penetrated by the tie-bar 441 for the purpose of preventing the disengagement of each rolls 42, 43. A gate-shape frame may be utilized instead of the tie-bar 441. Each roll housings 442, 443 is preferably provided at each ends of the rolls 42, 43. In that case, preferably four tie-bars 441 may be used in order to stabilize the device.

As necessary, an unwinding core 411 and a winding core 412 are mounted on a pressure device 44. The electrode structure 1 is unwound from the unwinding core 411 holding the electrode structure 1. Then, the pair of work rolls 43, 43 is rotated under pressure to be wound by the winding core 412. In that case, the winding core 411 and unwinding core 412 are mounted on a frame 413 fixed on a stationary part such as the housing 442 and may be driven and controlled by a motor 414.

Figure 9A:
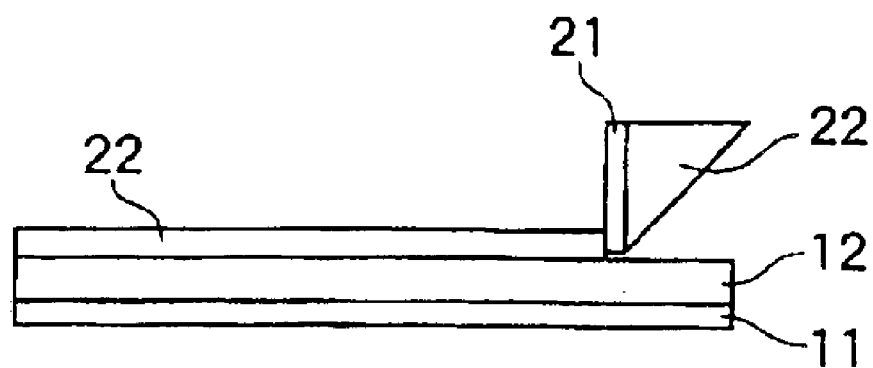
FIG. 9(A) represents a drawing showing an ion conductive polymer layer.
Figure 9B:
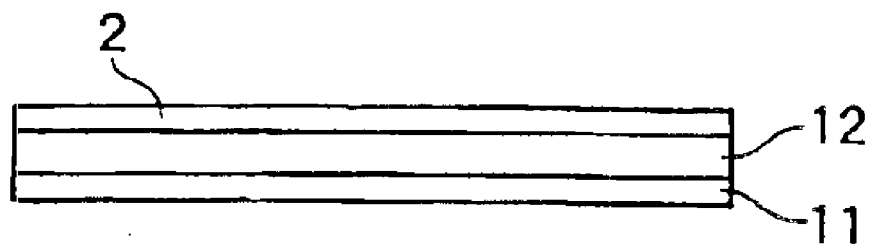
FIG. 9(B) represents a drawing showing an ion conductive polymer layer.
Figure 9C:
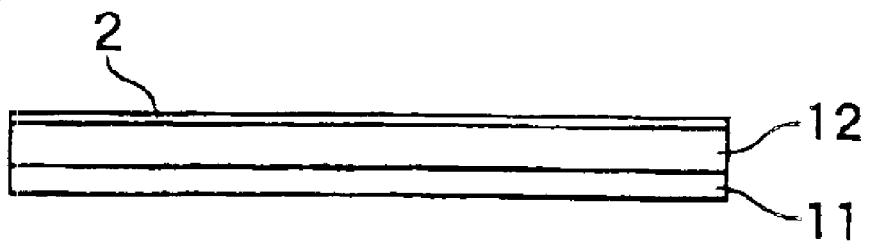
FIG. 9(C) represents a drawing showing an ion conductive polymer layer.

A coating material 22 for forming a paste-like ion conductive polymer layer to serve as the ion conductive polymer layer 2 is thinly coated on the surface of the electrode material layer 12 of the electrode structure 1 as shown in FIG. 4 using a doctor knife applicator 21 (FIG. 9(A)), and an ion conductive polymer layer 2 is formed on the electrode structure 1 (FIG. 9(B)). The coating material 22 for forming the ion conductive polymer layer is a material for forming the ion conductive polymer layer 2 by coating, and it is the ion conductive polymer forming material or a mixture of this with ion conductive salt such as lithium salt or a solvent. In case of the coating material 22 for forming ion conductive polymer layer, which is a mixture of ion conductive polymer forming material with organic solvent, it is dried after coating, and the solvent is purged from the ion conductive polymer layer 2 (FIG. 9(C)). When the coating material 22 for forming ion conductive polymer layer mixed with ion conductive salt such as lithium salt is coated on the ion conductive polymer forming material, ions such as lithium ions are dissolved in the ion conductive polymer layer 2.

Figure 10A:
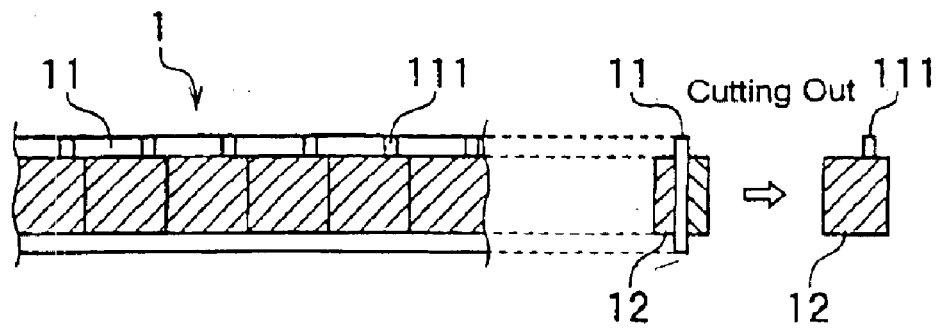
FIG. 10(A) represents a drawing showing a pattern of cutting the electrode out from the electrode structure.
Figure 10B:
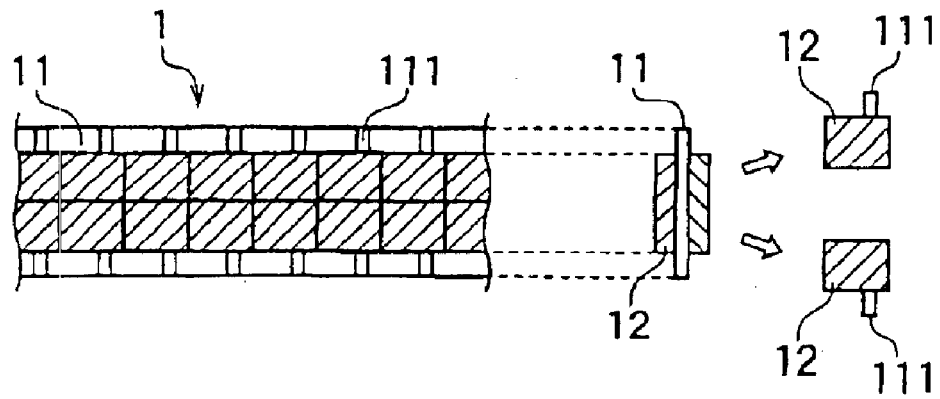
FIG. 10(B) represents a drawing showing a pattern of cutting the electrode out from the electrode structure.
Figure 10C:
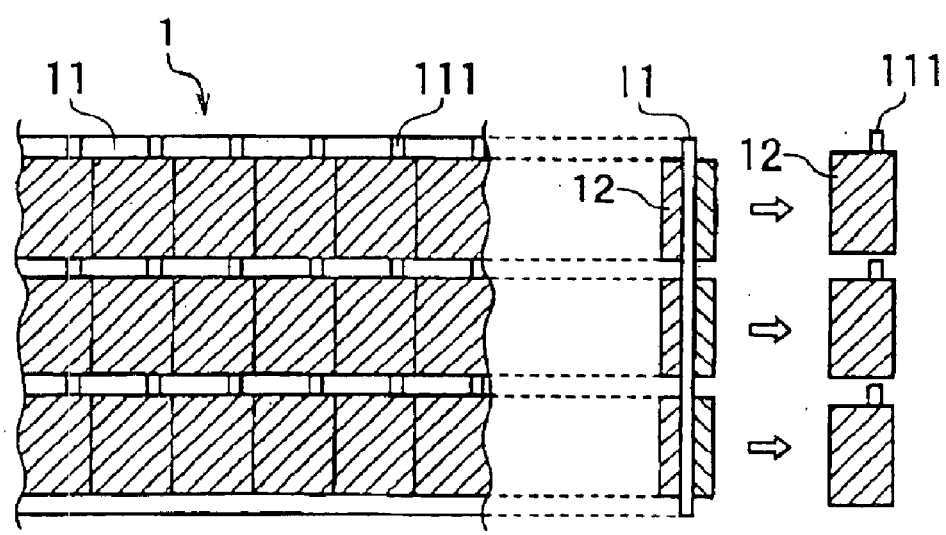
FIG. 10(C) represents a drawing showing a pattern of cutting the electrode out from the electrode structure.

The electrode is cut out from the pressurized electrode structure. Alternatively, the electrode structure obtained by forming the ion conductive polymer layer on the electrode material layer is cut out after pressurizing the electrode structure. There are various cut patterns for example as shown in cutting patterns of FIGS. 10(A)–10(C). FIG. 10(A) is one electrode material layer taken in one direction, i.e., cut out in a direction opposite to a longitudinal direction of the electrode material layer; FIG. 10(B) is one electrode material layer taken in a coupled form, i.e., cut out in two electrode rows along the longitudinal direction of the electrode material layer and in one direction just like in FIG. 10(A); and FIG. 10(C) is plural electrode layers taken in plural sections, i.e., cut out in one direction just like in FIG. 10(A) for every electrode material layer of plural rows. Order of cutting these electrode structures may be decided as necessary.

Figure 11A:
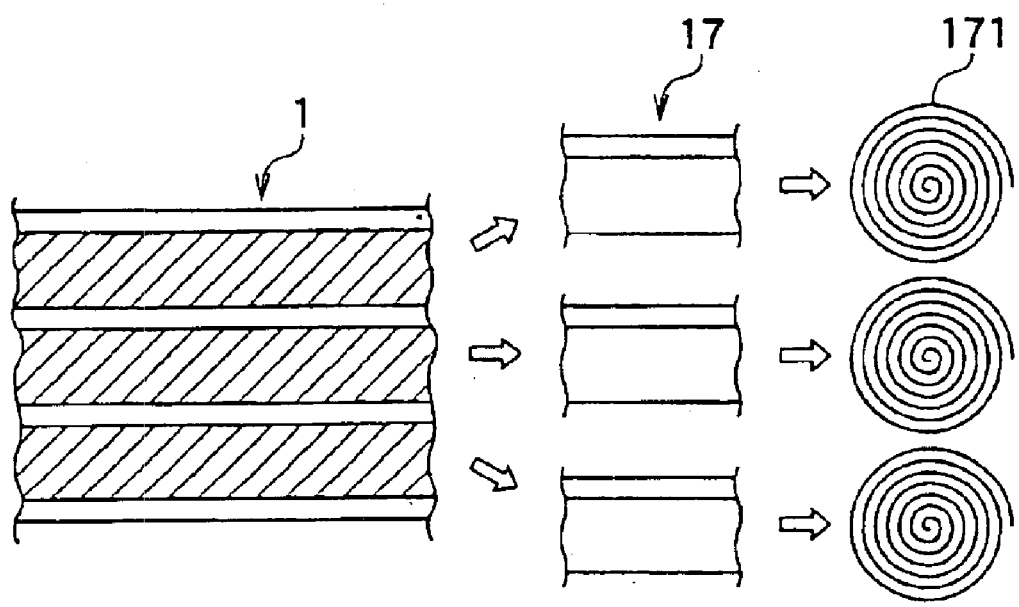
FIG. 11(A) represents a drawing showing the process of cutting the electrode out from the electrode structure.
Figure 11B:
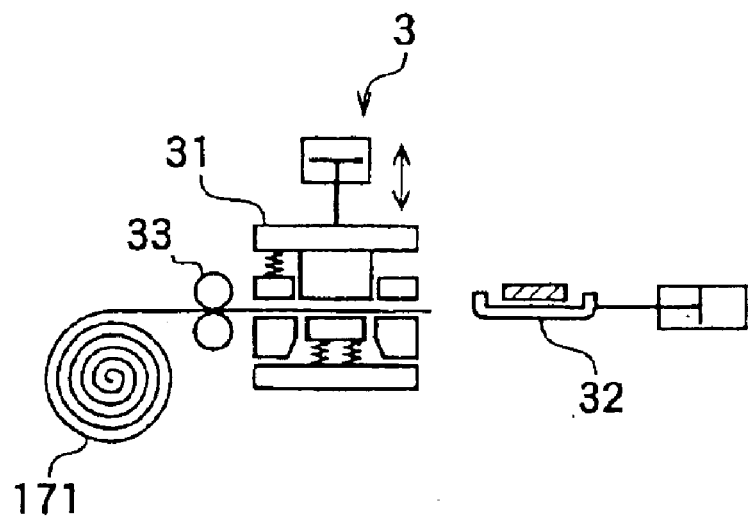
FIG. 11(B) represents a drawing showing the process of cutting the electrode out from the electrode structure.
Figure 11C:
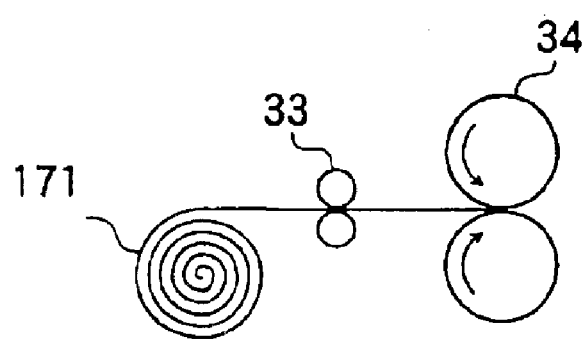
FIG. 11(C) represents a drawing showing the process of cutting the electrode out from the electrode structure.

The electrode structure with plural electrode material layer rows may be cut out into plural electrode rows 17 as shown in FIG. 11(A) to be wound and reeled in. The wound electrode rows 171 are unwound by feed rolls 33 as shown in FIG. 11(B) and are interruptedly transferred into a die cutting device 3 to be die-cut. At that time, when an upper cutter 31 of the die cutting device 3 is lifted, an electrode receive 32 is shifted toward the die cutting device 3 to gather the die cut electrodes. Alternatively, as shown in FIG. 11(C), blades are embedded in peripheral surfaces of rotary cutters to be rotated to cut out by conducting die-cutting.

Figure 3A:
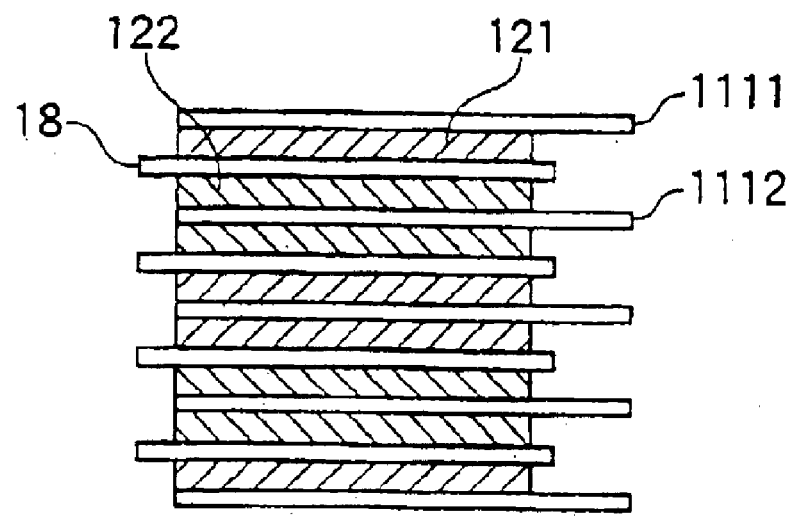
FIG. 3(A) represents a drawing of the structure of the layer-type electrode.
Figure 3B:
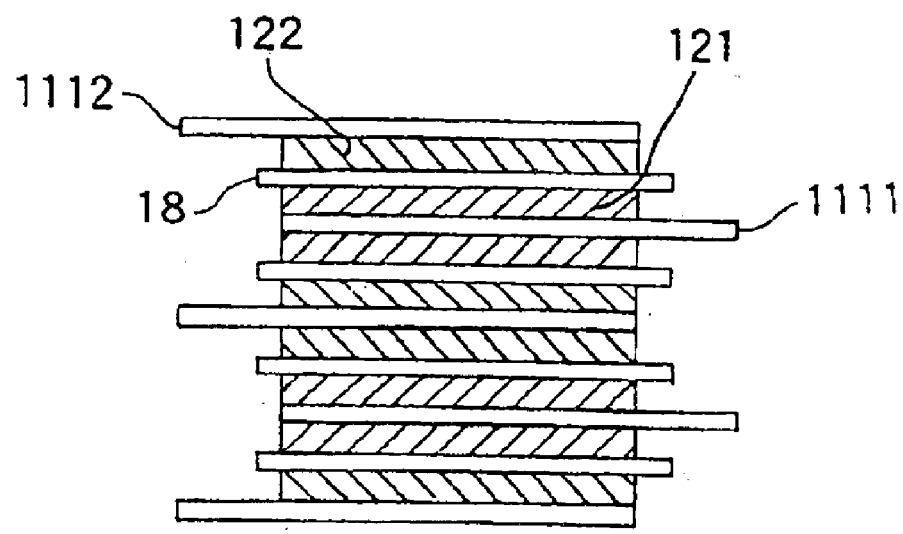
FIG. 3(B) represents a drawing of the structure of the layer-type electrode.

As shown in FIGS. 3(A) and 3(B), the positive and negative electrodes cut out may be layered and inserted between the separators 18 or layered without being inserted between the separators 18 to be stored in a container. At that time, the positive electrode leads 1111 are attached together to become a positive electrode terminal portion while the negative electrode leads 1112 are attached together to become a negative electrode terminal portion. Ion conductive polymer in a liquid state, solid state, or intermediate state between the liquid and solid states is inserted to facilitate ion migration between the positive and negative electrodes to obtain the electric components.

In the following, description will be given on a method for manufacturing electrode material, to which ion conductive polymer is adhered.

To manufacture the electrode structures, ion conductive polymer or ion conductive polymer raw material or a mixture of these, i.e., the material for forming ion conductive polymer, is attached in very thin thickness on the surface of an electrode material. Then, a solvent is added to turn it to liquid and paste-like state. This is coated on a current collecting material and is dried to evaporate the solvent. Alternatively, the solvent may be added from the beginning, and it may be turned to paste-like state at the same time as it is adhered to the ion conductive polymer forming material.

In this case, only a slight quantity of the ion conductive polymer forming material is used. The surfaces of particles of the powdery electrode material are adhered with ion conductive polymer so that there will be no void and that gaps between powder particles will be minimized.

To adhere the ion conductive polymer forming material with powdery electrode material, the ion conductive polymer forming material and the powdery electrode material are pressurized and ground against each other; and a pressurized product is obtained.

Pressurizing and grinding is defined as an operation to grind a mixture of the ion conductive polymer forming material and the powdery electrode material against each other while pressurizing. An external force is applied to the mixtures so that they cohere to each other and the particles rotate, and this process is performed repeatedly to obtain a press-sliding product.

A pressurizing, grinding and kneading device 5 is as shown in FIGS. 12(A)–12(D), for instance. The mixture 50 of the ion conductive polymer forming material and the powdery electrode material 13, or a mixture 50 containing this mixture and solvent, is placed in a container 51 with a lid 512, and a main blade 52 is rotated. There is a gap between a bottom 511 of the container 51 and the main blade 52. When the main blade 52 is rotated, a part of the mixture 50 is moved between the bottom 511 of the container and the main blade 52. It is subject to press-sliding and kneaded. This procedure is repeated, and the ion conductive polymer forming material is adhered to the powdery electrode material 13. A press-sliding mixer 5 may if necessary be provided with a dispersion blade 53 in the container 51. The dispersion blade 53 is rotated at high speed to disperse the press-slid mixture 50.

The container 51 is provided for holding the mixture 50 which is press-slide and stirred. At the bottom of the container 51, there is provided a lower portion 5111 with a part of it at lower position. The bottom surface is inclined upward as it goes toward peripheral portion. For instance, it is lower at the center, and it gradually goes up toward the periphery.

It is formed in a bottom 511 in shape of conical mortar. The inclination angle of the lower portion 5111 is set to 120 degree Celsius, for example. The bottom 511 of the container 51 has wear resistant property. It is made of SUS, for instance, and it is formed by spraying tungsten or carbide. Plural bottom parts of this type may also be formed on the bottom surface 5111.

Figure 12A:
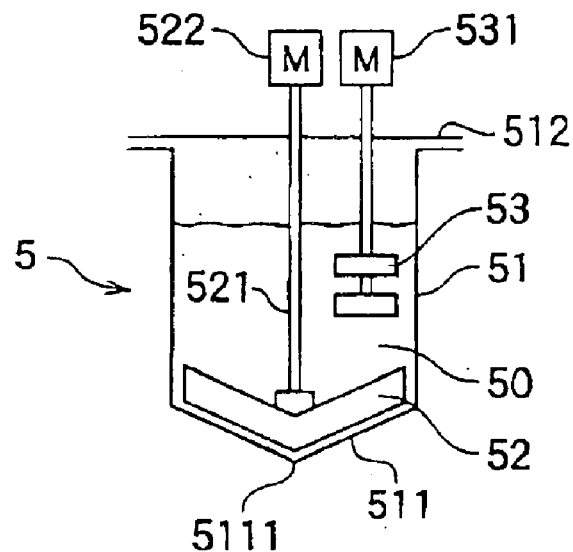
FIG. 12(A) represents drawing showing a press-sliding and kneading device.
Figure 12B:
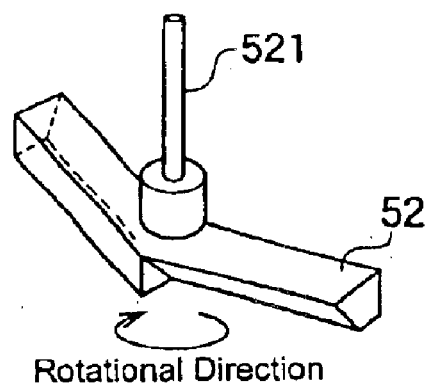
FIG. 12(B) represents drawing showing a press-sliding and kneading device.

The main blade 52 functions together with the bottom surface of the container 51, serving to press-slide and stir the mixture. As shown for example in FIG. 12(B), the main blade 52 is positioned via shaft 521 to the desired location relative to the bottom 5111 of the container 51 and gradually goes up from the bottom 5111 along the bottom surface of the container 51. The main blade 22 may comprise two blades attached from the center part as shown in FIG. 12(B), or it may comprise a larger number of blades, e.g. 10 or more, depending on the amount and type of mixture.

The number of rotations of a main motor 522 driving the main shaft 521 is set low for example to 120 rpm or less, when press-sliding is performed.

The gap between the bottom surface of the container 51 and the base surface of the main blade 52 is set as narrow as is necessary for press-sliding the mixture, for example 15 mm or less. This distance depends on the capacity of the press-sliding mixer 5 and on the shape of the main blade, etc.

Figure 12C:
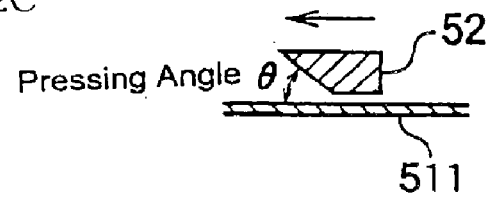
FIG. 12(C) represents drawing showing a press-sliding and kneading device.
Figure 12D:
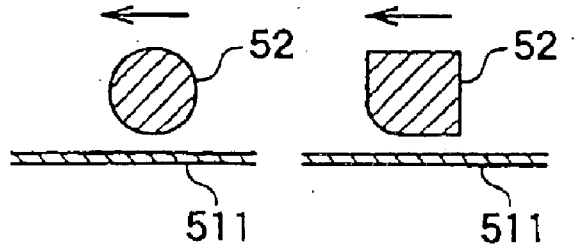
FIG. 12(D) represents drawing showing a press-sliding and kneading device.
Figure 13A:
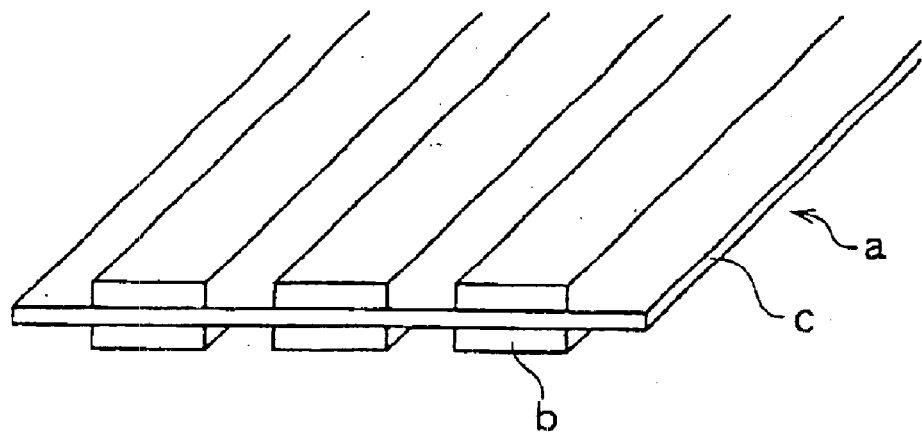
FIG. 13(A) represents a drawing showing a conventional slitter structure.
Figure 13B:
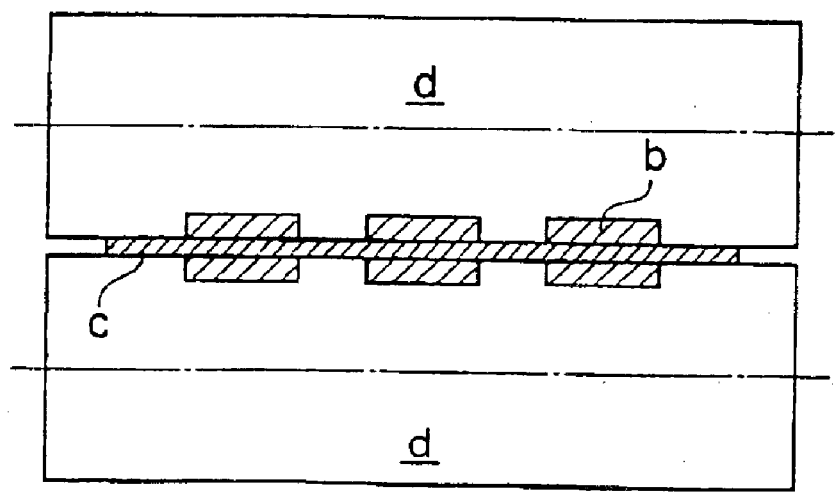
FIG. 13(B) represents drawing showing a press-sliding and kneading device.
Figure 13C:
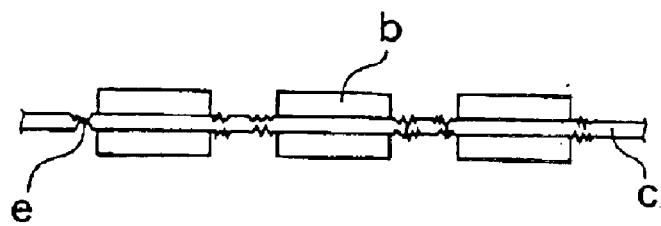
FIG. 13(C) represents drawing showing a press-sliding and kneading device.

The surface in the motion direction (press-sliding direction) of the main blade 52 is formed so that a pressing angle θ relative to the bottom surface of the container 51 is an acute angle. For example, if the cross-section of the main blade 52 is a reverse trapezoid as shown in FIG. 12(C), the pressing angle is from 3 degrees to 70 degrees. The cross-section of the main blade 52 may also be circular or have a rounded corner as shown in FIG. 12(D). The material of the main blade has wear-resistant properties and is formed for example by thermal spraying with tungsten or carbide using SUS.

The surface of the main blade 52 opposite to the advancing direction (direction of pressurizing and sliding) is designed in such manner that it runs almost perpendicularly to the bottom surface and at acute angle. As a result, when the main shaft 521 is rotated in reverse direction, the mixture 50 can be collected on the periphery of the main shaft 521.

If there are plural bottom parts on the bottom surface 5111, the center parts of the main blade 52 are also disposed in positions of the bottom part corresponding to their number.

The dispersion blade 53 disperses the mixture 50 which is press-slid by the main blade 52. The dispersion blade 53 is disposed in a position at which the mixture 50 can be dispersed, and it rotates at a high speed such as 1000–4000 rpm by a sub-motor 531. By rotating it at high speed, the ion conductive polymer 16 or its raw material adhered on the surface of the particles of the powdery electrode material 13 are evenly dispersed over the entire powdery material.

Now, description will be given on examples of the method for manufacturing the electrode structure of lithium ion secondary battery.

Into a pressurizing, grinding, and kneading device, 9.1 weight parts of $LiCoO_2$ with average particle size of 5 μm, i.e., powdery electrode active material, and 0.6 weight parts of graphite powder with average particle size of 4 μm, i.e., powdery conductive material, were placed, and the mixture was pressurized and ground for 20 minutes. Then, 0.546 weight part of an ion conductive polymer raw material (A1) and 3.5 weight parts of acetonitrile were added. The ion conductive polymer raw material (A1) is a mixture, and its composition and mixing ratio are as shown in Table 1.

TABLE 1

| Substance | Mixing ratio (weight parts) |
|---|---|
| Trifunctional (propylene glycol/ethylene glycol) random copolymer, SANNIX FA-103 (PO/EO = 2/8, Mw = 3,282, SANYO CHEMICAL INDUSTRIES, LTD.) | 8.36 |
| Trifunctional 1,4-butanediol | 0.34 |
| Ethylene cyanohydrin | 1.27 |
| Reaction catalyst NC-IM (SANKYO AIR PRODUCTS K.K.) | 0.03 |
| Total | 10 |

The pressurized product added with the ion conductive polymer raw material (A1) was pressurized and ground for 5 hours in the pressurizing, grinding and kneading device. The pressurized product was turned to paste-like state. To the pressurized product, 0.254 weight part of polymeric MDI, MR-220 (manufactured by NPU) was added, and the mixture was agitated for 5 minutes in the pressurizing, grinding and kneading device. The pressurized product was taken out, and this was placed on an aluminum foil of 20 $\mu$m in thickness and was cast using a doctor knife applicator with gap of 100 $\mu$m. This was left to stand at room temperature for 15 minutes and was then heated at 80 degree Celsius for 1 hour. The single side cast electrode obtained was turned over to be fixed on a plan surface and simultaneously was cast using a doctor knife applicator with gap of 100 $\mu$m. This was left to stand at room temperature for 15 minutes and was then heated at 80 degree Celsius for 1 hour. The electrode obtained had electrode layers coated on both sides of aluminum collector of 20 $\mu$m in thickness and has 170 $\mu$m in overall thickness.

Into a pressurizing, grinding and kneading device (volume capacity: 300 cc), 9.1 weight parts of graphite powder with average particle size of 5 $\mu$m, i.e., powdery electrode active material, 0.341 weight parts of ion conductive polymer raw material (A1), and 3.0 weight parts of acetonitrile were placed, and the mixture was pressurized and ground for 7 hours. The pressurized product was turned to paste-like state. Then, 0.159 weight part of polymeric MDI, MR-200 (manufactured by NPU) was added, and the mixture was pressurized and ground for 5 minutes. The pressurized product was taken out and was placed on a copper foil of 20 $\mu$m in thickness and was cast using a doctor knife applicator with gap of 100 $\mu$m. This was left to stand at room temperature for 15 minutes and was then heated at 80 degree Celsius for 1 hour. The single side cast electrode obtained was turned over to be fixed on a plan surface and simultaneously was cast using a doctor knife applicator with gap of 100 $\mu$m. This was left to stand at room temperature for 15 minutes and was then heated at 80 degree Celsius for 1 hour. The electrode obtained had electrode layers coated on both sides of copper collector of 20 $\mu$m in thickness and has 170 $\mu$m in overall thickness.

This invention as described above, renders the following advantages: (A) An object of this invention is to provide a pressure method for an electrode without causing any breakage of a current collecting material. (B) Another object of this invention is to facilitate manufacture of an electrode of layer-type.

What we claim is:

1. A pressure method for an electrode structure comprising a step of:

provided a pair of work rolls and pressurizing the electrode structure between the pair of work rolls, wherein the electrode structure comprises a current collecting material and an electrode layer where said electrode layer has a smaller surface area than a surface area of the current collecting material wherein a rolling surface of at least one work roll of said pair of work rolls is having a concave and a convex portions, wherein said work roll applies pressure with said concave portion to said electrode layer coated on said current collecting material, thereby elongating said electrode layer and said current collecting material; and said work roll applies pressure with said convex portion to a section of said current collecting material without said electrode layer coated thereon where said section of the current collecting material is a predetermined distance away from said electrode layer, thereby elongating said section of the current collecting material.

2. The pressure method for the electrode structure as claimed in claim 1, wherein the electrode layer is formed to face both surfaces of the current collecting material.

3. The pressure method for the electrode structure as claimed in claim 1, wherein said pair of work rolls, each comprising a roll axle, and wherein said rolling surface of said work roll of said pair of work rolls has a stepped surface parallel to the roll axles and the other work roll of said pair of work rolls has a linear surface parallel to the roll axles, whereby said electrode structure is sandwiched and pressurized between said linear surface and said stepped surface.

4. The pressure method for the electrode structure as claimed in claim 1, wherein said pair of work rolls, each comprising a roll axle, and wherein each of said work roll surfaces has a stepped surface parallel to the roll axles, whereby said electrode structure is sandwiched and pressurized between the stepped surfaces.

5. A pressure method for an electrode structure comprising a step of:

providing a pair of work rolls and pressurizing the electrode structure between the pair of work rolls, wherein the electrode structure comprises a long current collecting material and a long electrode layer whereby said electrode layer has a smaller surface area than a surface area of said current collecting material, wherein a rolling surface of at least one work roll of said pair of work rolls have been added pressure with said concave portion to said electrode layer coated on said current collecting material, thereby elongating said electrode layer and said current collecting material; and said work roll applies pressure with said convex portion to a section of the current collecting material without said electrode layer coated thereon where said section of the current collecting material is a predetermined distance away from the electrode layer, thereby elongating said section of the current collecting material.

6. The pressure method for the electrode structure as claimed in claim 5, wherein the electrode layer is formed to face both surfaces of the current collecting material.

7. The pressure method for the electrode structure as claimed in claim 5, wherein said pair of work rolls, each comprising a roll axle, and wherein said rolling surface of said work roll of said pair of work rolls has a stepped surface parallel to the roll axles and the other work roll of said pair of work rolls has a linear surface parallel to the roll axles, whereby said electrode structure is sandwiched and pressurized between said linear surface and said stepped surface.

8. The pressure method for the electrode structure as claimed in claim 5, wherein said pair of work rolls, each comprising a roll axle, and wherein each of said work roll surfaces has a stepped surface parallel to the roll axles, whereby said electrode structure is sandwiched and pressurized between the stepped surfaces.

* * * * *